United States Patent
Sistu et al.

(10) Patent No.: US 12,314,164 B1
(45) Date of Patent: May 27, 2025

(54) MEMORY MANAGEMENT IN AN INFORMATION HANDLING SYSTEM

(71) Applicant: DELL PRODUCTS L.P., Round Rock, TX (US)

(72) Inventors: Krishnaveni Sistu, Leander, TX (US); Ibrahim Sayyed, Georgetown, TX (US); Phanindra Talasila, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/421,068

(22) Filed: Jan. 24, 2024

(51) Int. Cl.
*G06F 12/02* (2006.01)
*G06F 9/50* (2006.01)

(52) U.S. Cl.
CPC .......... *G06F 12/023* (2013.01); *G06F 9/5016* (2013.01)

(58) Field of Classification Search
CPC ...... G06F 3/06; G06F 12/023; G06F 9/45505; G06F 9/4401; G06F 9/4411; G06F 9/4406; G06F 9/5016; G06F 9/4416; G06F 11/2284; G06F 11/2273

See application file for complete search history.

(56) References Cited

U.S. PATENT DOCUMENTS

| | | | |
|---|---|---|---|
| 9,342,316 B1* | 5/2016 | Sivertsen | G06F 9/4406 |
| 10,860,307 B2 | 12/2020 | Suryanarayana et al. | |
| 11,609,756 B2 | 3/2023 | Sayyed et al. | |
| 2012/0117367 A1* | 5/2012 | Lu | G06F 9/4401 713/2 |
| 2017/0293451 A1* | 10/2017 | Pan | G06F 3/061 |
| 2019/0339986 A1* | 11/2019 | Khatri | G06F 13/24 |

* cited by examiner

*Primary Examiner* — Khoa D Doan
(74) *Attorney, Agent, or Firm* — Larson Newman, LLP (57) ABSTRACT

An information handling system includes a first memory and a basic input/output system (BIOS). The first memory includes an extended system partition (ESP). The BIOS creates a table that includes data associated with a first amount of memory space in the ESP needed for BIOS firmware images. The BIOS stores in the table in a second memory of the BIOS. During an initialization of an operating system (OS), a processor retrieves the data from the table. The processor determines a second amount of memory space in the ESP needed for OS boot critical files, and determines a total amount of memory space needed in the ESP based on the first and second amounts of memory space. The processor allocates the total amount of memory space to the ESP in the first memory.

20 Claims, 7 Drawing Sheets

MEMORY MANAGEMENT IN AN INFORMATION HANDLING SYSTEM

FIELD OF THE DISCLOSURE

The present disclosure generally relates to information handling systems, and more particularly relates to performing memory management in an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a first memory and a basic input/output system (BIOS). The first memory may include an extended system partition (ESP). The BIOS may create a table that includes data associated with a first amount of memory space in the ESP needed for BIOS firmware images. The BIOS may store the table in a second memory of the BIOS. During an initialization of an operating system (OS), a processor may retrieve the data from the table. The processor may determine a second amount of memory space in the ESP needed for OS boot critical files, and determine a total amount of memory space needed in the ESP based on the first and second amounts of memory space. The processor may allocate the total amount of memory space to the ESP in the first memory.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
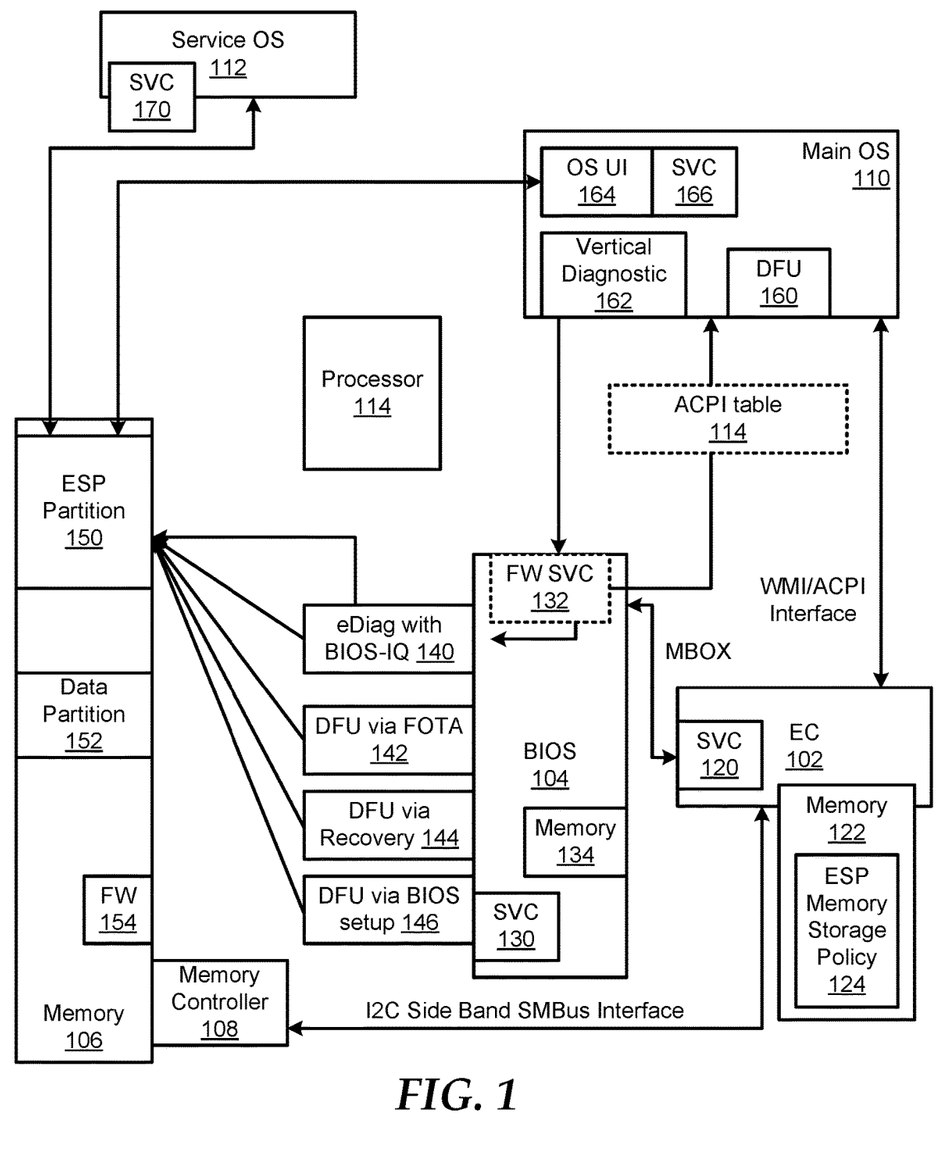
FIG. 1 is a block diagram of a portion of an information handling system according to at least one embodiment of the present disclosure.

FIG. 1 shows an information handling system 100 according to at least one embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), server (such as a blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Information handling system 100 includes an embedded controller (EC) 102, a basic input/output system (BIOS) 104, a memory 106, a memory controller 108, a main operating system (OS) 110, a service OS 112, and a processor 114. EC 102 may execute a service 120, and may include a memory 122. Memory 122 may store data associated with information handling system 100, such as a memory storage policy 124. BIOS 104 may include and execute different services 130 and 132, and include a memory 134. Information handling system 100 also includes a BIOS-IQ application 140, a multiple device firmware update (DFU) applications 142, 144, and 146. Memory 106 is divided into different partitions including an Extended System Partition (ESP) partition 150, a data partition 152, or the like. Memory 106 includes firmware 154 to control write access to partitions 150 and 152 of the memory. Main OS 110 includes different applications including a DFU application 160, a vertical diagnostic application 162, an operating system user interface (OS UI) 164, and a service 166. Service OS 112 may execute a service 170. In an example, OS UI 164 may be any suitable user interface for OS 110, such as Windows or the like. Information handling system 100 may include other components without varying from the scope of this disclosure.

In an example, EC 102 may read data from or write data to different regions of memory 106, such as ESP partition 150 and data partition 152, via memory controller 108. The communication between EC 102 and memory controller 108 may be over an inter-integrated circuit (I2C) side-band system management bus (SMBus) interface as illustrated in FIG. 1. In certain examples, firmware service 120 of EC 102 may communicate with firmware service 132 of BIOS 104 via any suitable communication interface, such as a mail box (MBOX) communication interface. In an example, EC 102 may communicate with OS 110 via any suitable interface, such as a windows management instrumentation (WMI)/ACPI interface. As used herein, any operations described as being performed by OS 110 or 112, firmware services 120, 130, 132, BIOS services 140, 142, 144, and 146, software services 170 may be performed by processor 114, EC 102, BIOS 104, or any other suitable hardware component of information handling system 100 without varying from the scope of this disclosure. For example, processor 114 may execute and perform all operations described herein as being performed by OS 110 and 112, DFU 160, vertical diagnostic 162, OS UI 164, and services 166 and 170.

In certain examples, services 120, 130, 132, 166, and 170 may be different types of services, such as either software or firmware services. For example, services 120, 130, and 132 may be firmware services, and service 166 and 170 may be software services. These services 120, 130, 132, 166, and 170 may be utilized by applications and components of information handling system 100 to write data to ESP partition 150. In an example, ESP partition 150 may be allocated to a particular memory size, such as a size ranging from 100 to 300 MB. Based on the allocated of ESP partition 150, OS 110 may be a unified extensible firmware interface (UEFI) advanced configuration and power interface (ACPI)-compliant operating system. In an example, ESP partition 150 may store various files, including critical boot files from a vendor of main OS 110, flash images from a vendor of BIOS 104, and boot critical and recovery files from hardware vendors, which may include instrumentation data. In certain examples, ESP partition 150 may be a shared memory space.

In an example, there are no specifications or guidelines identifying how much ESP memory space is needed by different vendors, and an amount of storage space allocated to ESP partition 150 may vary based on a system configuration and the type of main OS 110, such as Win10 or Win11. Additionally, the amount of storage space allocated to ESP partition 150 may depend on the serial peripheral interface (SPI) size of BIOS 104, which may be 16 MB, 32 MB, 64 MB, or the like. The amount of storage space allocated to ESP partition 150 may also depend on any value-added pre-OS feature sets. In current information handling systems 100, there is no ESP memory manager to track and flag any firmware or software services that consume more space than desired. Also, in current information handling systems, there is no storage policy that requires services to check available space before performing write operations. Current information handling systems also do not determine the required size of the ESP partition, because the OS application reserves space on its own. Lastly, in current information handling systems there is no compatibility between BIOS and UEFI-compliant main OS in terms of ESP storage reservation.

Information handling system 100 may be improved by EC 102 and BIOS 104 performing multiple operations to ensure that the ESP partition 140 remains available for data storage of critical functions, such as OS and BIOS updates, system recovery, or the like. Information handling system 100 may be further improved by coordination between UEFI and Core OS services along with EC 102 to implement of an ESP memory manager. This memory manager may be responsible for monitoring and efficiently managing the space within ESP partition 150. These operations performed by EC 102 and BIOS 104 may guarantee that essential services always have sufficient space to carry out their tasks effectively.

Information handling system 100 may also be improved by BIOS 104 providing information about space requirements within ESP partition via ACPI-compliant operations, such as ACPI table 114. In certain examples, ACPI table 114 may include details on the space needed for BIOS firmware images, the amount of space required for storing critical instrumentation data, the space necessary for holding rescue OS recovery boot critical images, or the like. Information handling system 100 may be further improved by the creation of an ESP memory storage policy 124 inside memory 122 of EC 102 so that firmware and software core services 120, 130, 132, 166, and 170 determine space requirements of ESP partition 150.

In an example, firmware service 132 of BIOS 130 may perform one or more suitable operations to create and publish an ESP partition size policy. In certain examples, the amount or space of ESP partition 150 consumed or utilized by BIOS 104 may vary based on the platform model of information handling system 100. Firmware service 132 of BIOS 130 may determine different policies and/or requirements of BIOS 104 for data storage in ESP partition 150 of memory 106. In an example, the policies may include any suitable data associated with the ESP memory space, such as storage requirements, storage limits, UEFI BIOS ESP memory size requirement, or the like. In certain examples, after the ESP partition size policy being created, firmware service 132 may publish the ESP partition size policy in ACPI table 114. In an example, firmware service 132 may dynamically create the policy information and populate the dynamically created policy in ACPI table 114. In certain examples, ACPI table 114 may be stored in any suitable memory, such as memory 134.

In response to an initialization of main OS 110, the OS may retrieve the BIOS ESP memory requirement and other ESP memory policy data from ACPI table 114 in memory 134. In an example, firmware service 132 may provide ACPI table 114 to OS 110. During the initialization, the consumption of the policy information by main OS 110 may enable the OS to create ESP partition 150 with a proper size and format at the time of the installation. Main OS 110 may utilize the data in ACPI table 114 to allocate sufficient space in memory 106 to ESP partition 150 for requirements of the OS and for files and data associated with the BIOS 104.

Main OS 110 may create or allocate ESP partition 150 with a particular memory space or size within memory 106. For example, if ACPI table 114 includes information that BIOS 104 needs a lot of storage space in ESP partition 150, OS 110 may add the BIOS storage space to an amount of storage needed for OS boot critical files to properly allocate and format the size of the ESP partition within memory 106. In certain examples, the allocated storage size of ESP partition 150 may be static after the initial allocation and formatting of the ESP partition until a re-formatting during an OS initialization is performed. In an example, the memory space or size is based on OS space requirements and the data in ACPI table 114. In this example, ACPI table 114 may ensure that core firmware update and recovery functionalities are not affected after OS updates.

In certain examples, a software update for main OS 110 may start in response to any suitable operation of information handling system 100. In an example, the OS software update may be any suitable type of update, such as driver updates, an OS patch update, OS re-imaging, or the like. During the software update, DFU 160 may check a current amount memory space of memory 106 both allocated to and currently available in ESP partition 150 to store data. Based on the current amount of memory space for ESP partition 150, DFU 160 may determine whether enough memory space is available in ESP partition 150 for writing OS boot critical files. In an example, this determination may be made in any suitable manner. For example, DFU 160 may compare the currently available amount of space in ESP partition 150 to the memory space limit or minimum amount of memory space needed by BIOS 104, which may be stored in ACPI table 114. If DFU 160 determines that not enough memory space is available in ESP partition 150 for the critical boot files, the DFU may log an error event. However, if DFU 160 determines that enough memory space is available, the main OS boot critical files may be written to ESP partition 150, and the software update may be completed.

In an example, ESP memory storage policy 124 may be utilized to ensure that firmware service 120 does not saturate ESP memory partition 150 during pre-boot and runtime services. Firmware service 120 may track, manage, and flag ESP memory consumption. ESP memory storage policy 124 may include any suitable data associated with ESP partition 150 of memory 106. For example, the data within ESP memory storage policy 124 may include multiple different rules for access of ESP partition 150 by different components of information handling system 100.

For example, one of the multiple policy rules may include a restriction of firmware service 132 may not be able to write to ESP partition 150 when firmware service (SBIOS) 132 reaches exit boot services. Another one of the policy rules may restrict access to ESP partition 150 when BIOS 104 is booted to third party UEFI shells. ESP memory storage policy 124 may also include a rule to flag UEFI firmware services, such as services 130 and 130, which are consuming more than anticipated memory space limit within ESP partition 150. For example, EC 102 may monitor operations performed by the BIOS services and determine based on ESP memory storage policy 124 whether one of the BIOS services is consuming more than anticipated memory space limit within ESP partition 150. If so, EC 102 may communicate with BIOS 104 and cause the BIOS to stop the BIOS service from accessing ESP partition 150.

In certain examples, another one of the multiple policy rules of ESP memory storage policy 124 may be to prevent write operations to ESP partition 150 for policy violators when memory 106 supports using EC side band management. ESP memory storage policy 124 may also include a rule to define storage limits in ESP partition 150 for telemetry data, diagnostics data, recovery data, flash update data, or the like. Another rule in ESP memory storage policy 124 may be a storage priority order within ESP partition 150. For example, flash update data may take precedence, then telemetry data, followed by diagnostic data, or the like. While only a few policy rules have been described herein, ESP memory storage policy 124 may include any suitable number of rules and the rules may be scalable without varying from the scope of this disclosure. In certain examples, the rules within ESP memory storage policy 124 may ensure that ESP partition is not saturated during OS and BIOS updates. ESP memory storage policy 124 may be accessible during both pre-boot and OS runtime via in-band and side-band management interfaces. In an example, side-band management interface may include the I2C side-band SMBus interface between EC 102 and memory controller 108 as illustrated in FIG. 1.

In an example, when information handling system 100 is in a service OS recovery space and files need to be written into ESP partition 150, service OS 114 may communicate with EC 102. In certain examples, EC 102 may provide service OS 114 with policies and rules, from ESP memory storage policy 124, associated with writing to ESP partition 150. Based on the received policies and rules, service OS 114 may perform different actions to make space in ESP partition 150 for service OS data write operations.

In an example, service OS 112, via software service 170, may check memory size of ESP partition 150 before any BIOS feature is enabled to write to the ESP partition. In certain examples, different BIOS features may require or need different amounts of memory space within ESP partition 150. For example, BIOS-IQ application 140 may offload telemetry data to ESP partition 150, and the telemetry data may have a maximum limit of 5 MB. While 5 MB limit is described herein for telemetry data, the telemetry data may be any other size without varying from the scope of this disclosure. In an example, BIOS-IQ application 140 may write logs as xml files to ESP partition 150, and xml files may have a maximum limit of 10 MB. While 10 MB limit is described herein for logs as xml files, the logs may be any other size without varying from the scope of this disclosure. In an example, DFU application 144 may write crash data dump to ESP partition 150 and write crash data dump may have a maximum limit of 16 MB. While 16 MB limit is described herein for crash data dump, the crash data dump may be any other size without varying from the scope of this disclosure. In an example, DFU application 142 or 146 may write flash updates to ESP partition 150, and flash updates may have a maximum limit of 36+MB. While 36+MB limit is described herein for flash updates, the flash updates may be any other size without varying from the scope of this disclosure.

In certain examples, firmware services 120, 130, and 132 may determine whether ESP partition 150 has enough space for a write from one of the BIOS features, such as BIOS-IQ application 140 and DFU applications 142, 144, and 146. For example, firmware services 120, 130, and 132 may verify that ESP partition 150 has the required minimum available space before enabling a write operation to the ESP partition. In an example, EC 102 may track, via MBOX, the write operations of BIOS-IQ application 140 in ESP partition 150 and flag BIOS 104 to restrict or throttle write operations before the ESP partition is saturated.

In an example, EC 102 may track or monitor the write operations of different software/firmware features of BIOS 104, such as BIOS-IQ application 140 and DFU applications 142, 144, and 146. EC 102 may monitor the write operations via any suitable manner including, but not limited to, over the MBOX interface between the EC and BIOS 104. EC 102 may determine whether one or more of the write operations violates one or more of the ESP storage rules in ESP memory storage policy 124. In response to EC 102 determining that one or more of the write operations by the different software/firmware features of BIOS 104, the EC may provide a command to firmware 154 of memory 106 to block writes to ESP partition 150 by the software/firmware features of the BIOS. In an example, EC 102 may provide the command to firmware 154 via memory controller 108 over the I2C SMBus interface. In certain examples, the blocking of writes may be at a root or sector level. The root or sector level may be a top-level of the directory structure for ESP partition 150 of memory 106.

When BIOS features, such as BIOS-IQ application 140 and DFU applications 142, 144, and 146, try writing more than an allocated space in ESP partition 150, firmware service 132 may flag the write request and cause the write operation to fail. In certain examples, if a no-POST environment occurs within information handling system 100, firmware service 132 may perform one or more suitable operations to enable crash data dump to be stored within ESP partition 150. For example, firmware service 132 may determine the amount of space needed for the crash data dump and determine an amount of available space within ESP partition 150. If ESP partition 150 does not have enough memory space available for the crash data dump, firmware service 132 may delete files/data in the ESP partition to free enough space for the crash data dump. In an example, the deletion of files/data may be done or performed in a priority order to free enough space for the crash data dump. In certain examples, OS IU 164 and software services 166 and 170 may read ACPI table 114, and retrieve the data associated with ESP partition 150. The data associated with ESP partition 150 may be any suitable data including, but not limited to, storage space requirements for the BIOS services and a current available memory space in ESP partition 150. Based on this data retrieved from ACPI table 114, OS IU 164 and software services 166 and 170 may determine whether the BIOS feature may perform a write to ESP partition 150.

In an example, vertical diagnostic application 162 may be located within main OS 110 and communicate with BIOS 104. This communication may include, but is not limited to, vertical diagnostic application 162 pushing or transferring troubleshooting operations to BIOS 104. In certain examples, the troubleshooting operations may be transferred from OS 110 to BIOS 104 because access to resources within information handling system 100 may not be fully available in the main OS and only available in the BIOS space. Thus, running memory and storage diagnostics in OS 110 may not be effective due to the limitation on device resource access. In this example, vertical diagnostic application 162 may send a deep-down request to BIOS 104 to run the diagnostic test. During this operation, BIOS 104, via firmware service 132, may collect telemetry data from memory and disk modules and save the telemetry data in data partition 152. However, if data partition 152 is full, firmware service 132 of BIOS 104 may store the telemetry data in ESP partition 150. In certain examples, firmware service 132 may determine whether ESP partition 150 storage space is about to be saturated. If the storage space of ESP partition 150 is about to be saturated, firmware service 132 of BIOS 104 may store the telemetry data in a backend memory, in an offline storage, or the like.

In certain examples, ESP memory storage policy 122 may include rules to make firmware update and recovery files are priority. In an example, BIOS 104, via firmware service 132, may ensure ESP partition 150 is not saturated by BIOS service features and mitigate any errors during a firmware update and recovery. In certain examples, EC 102 may utilize ESP memory storage policy 122 to prevent OS boot files from being deleted and thereby prevent a no POST situation from occurring within information handling system 100.

As described herein, EC 102 and BIOS 104 may perform different operations to provide storage space requirements of ESP partition 150 to main OS 110 through ACPI table 114. In an example, EC 102 may include an ESP memory storage policy 122 that is accessible across different operating environments, such as firmware and software services 120, 130, 132, 166, and 170, to avoid saturation of ESP partition 150. In this example, EC 102 may utilize side band management over the SMBus interface to restrict and control writes at a disk core level if any service violates ESP memory storage policy 122. In an example, memory controller 108 may support and enable EC 102 to restrict and control writes to ESP partition. In certain examples, EC 102 and BIOS 104 may perform different operations to reserve and make enough disk space available in ESP partition 150 to achieve guaranteed BIOS recovery and guaranteed WU success, such that the EC and the BIOS coordinate to perform ESP memory management.

Figure 2:
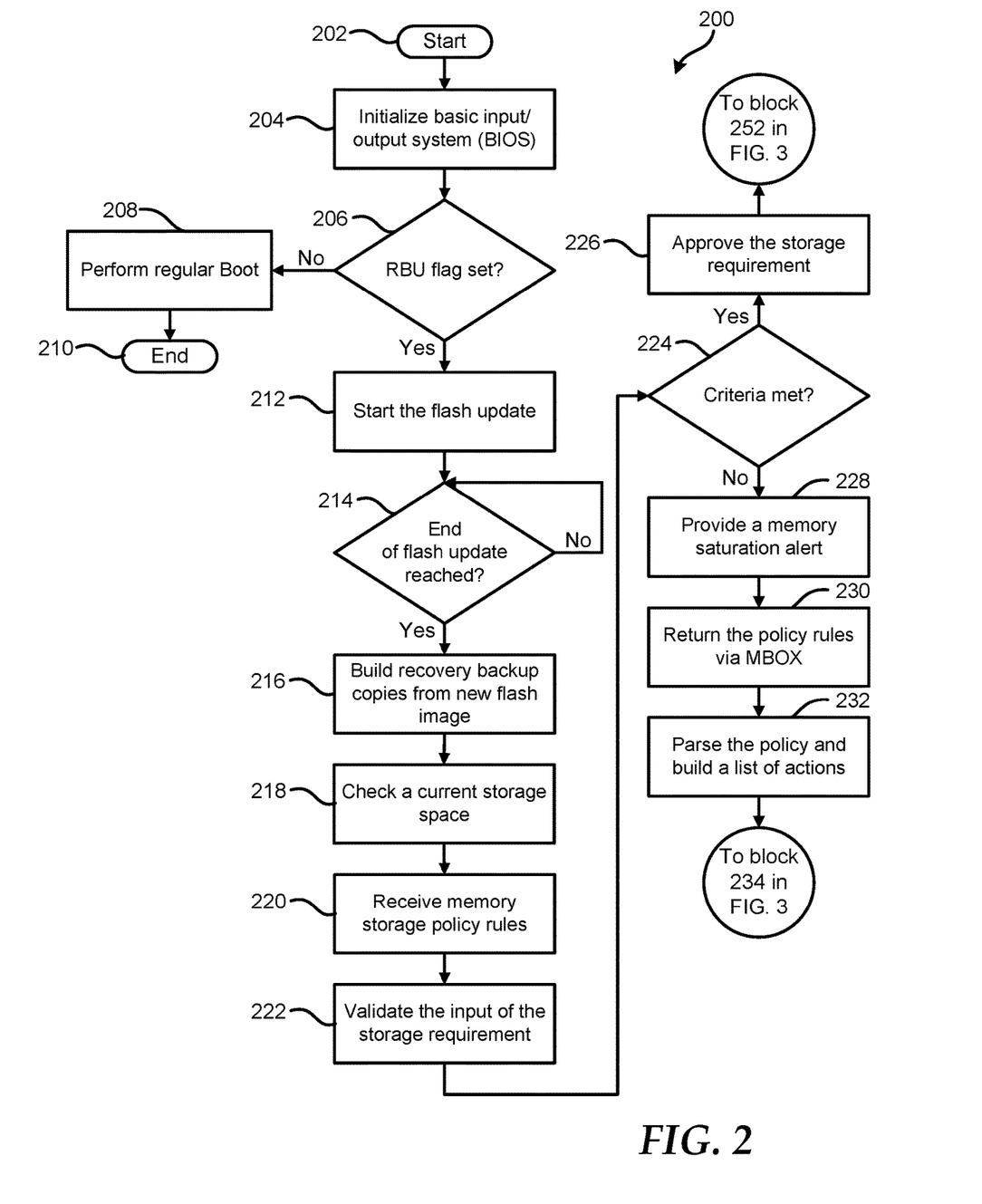
FIGS. 2 and 3 are a flow diagram of a method for utilizing memory space policy data in writing to the memory space according to at least one embodiment of the present disclosure.
Figure 3:
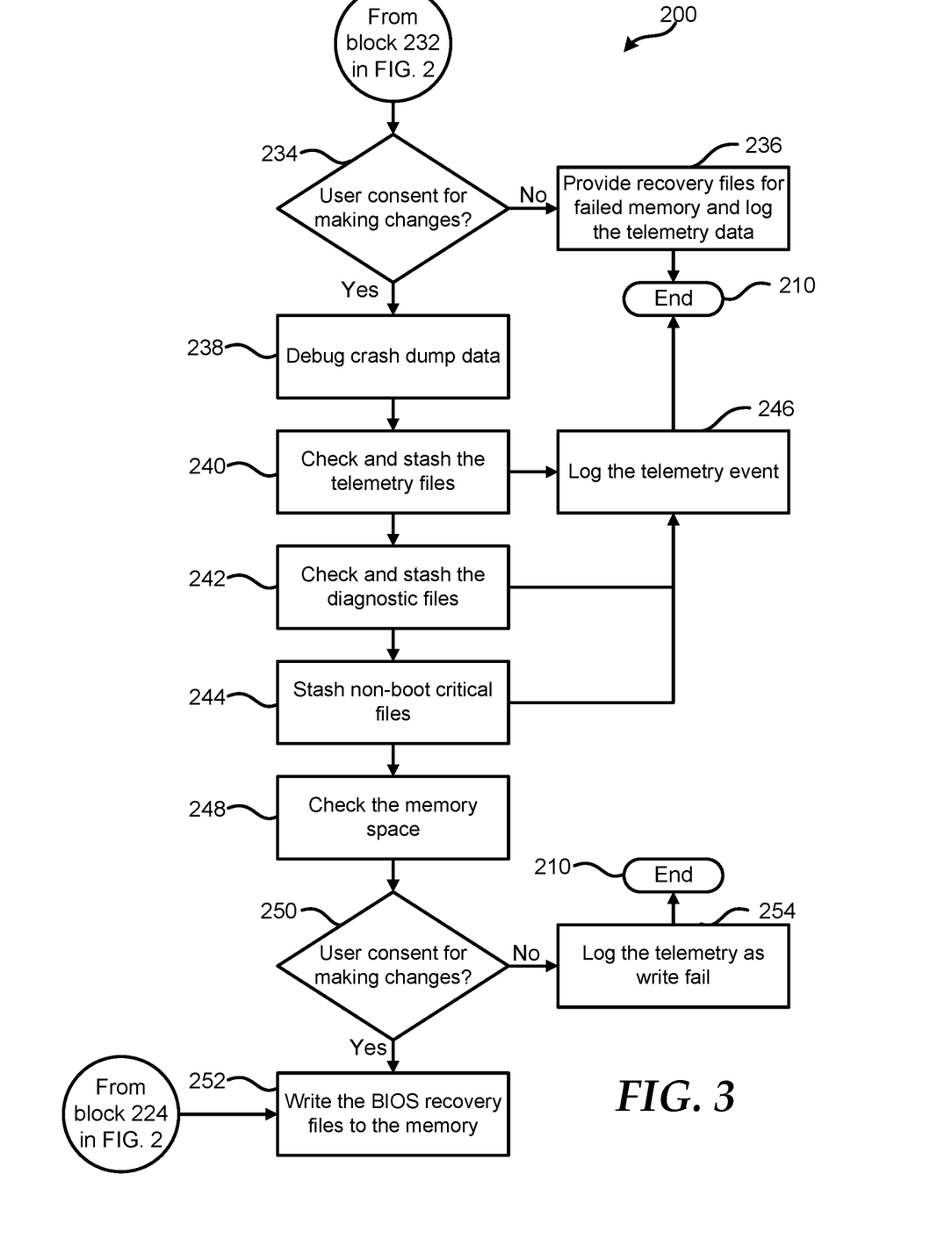

FIGS. 2 and 3 are a flow diagram of a method 200 for utilizing memory space policy data in writing to the memory space according to at least one embodiment of the present disclosure, starting at block 202. It will be readily appreciated that not every method step set forth in this flow diagram is always necessary, and that certain steps of the methods may be combined, performed simultaneously, in a different order, or perhaps omitted, without varying from the scope of the disclosure. FIGS. 2 and 3 may be employed in whole, or in part, embedded controller 102 and BIOS 104 of FIG. 1, or any other type of controller, device, module, processor, or any combination thereof, operable to employ all, or portions of, the method of FIGS. 2 and 3.

At block 204, a BIOS is initialized. At block 206, a determination is made whether a remote BIOS update (RBU) flag is set. If the RBU flag is not set, a regular boot of the information handling system is performed at block 208, and the flow ends at block 210. If the RBU flag is set, the flash update is started at block 212. At block 214, a determination is made whether an end of the flash update has been reached. When the end of the flash update has been reached, recovery backup files are created from the new flash image at block 216.

At block 218, a current storage space is checked. In an example, checking the current storage space may include determining the amount of ESP partition storage space left. This check may be performed by the BIOS of the information handling system. In certain examples, the check of the amount of ESP partition storage space left may be done based on the BIOS having recovery content to be saved in ESP partition storage. At block 220, memory storage policy rules are received. In an example, the memory storage policy rules may be received from an embedded controller of the information handling system. At block 222, the input of the storage requirement is validated. At block 224, a determination is made whether a criteria has been met. If the criteria have been met, the storage requirement is approved at block 226 and the flow continues at block 252 in FIG. 3. If the criteria have not been met, a memory saturation alert is provided at block 228.

At block 230, the policy rules are return. In an example, the policy rules may be returned is any suitable manner, such as via a mailbox (MBOX) communication. At block 232, the policy is parsed, a list of actions is built, and the flow continues at block 234 in FIG. 3. In an example, the list of actions may include, but is not limited to, operations that make space in the ESP partition by removing debug data and files that are low priority. At block 234, a determination is made whether a user consents to making changes to information handling system. If the user does not consent to making changes, recovery files for failed memory are provided and the telemetry data is logged at block 236 and the flow ends at block 210. If the user consents to changes, crash dump data is debugged at block 238.

At block 240, the telemetry data is checked and stashed. At block 242, the diagnostic files are checked and stashed. At block 244, non-boot critical files are checked. In an example, after each one or more of blocks 240, 242, and 244 are completed, the telemetry event is logged at 246 and the flow ends at block 210. At block 248, the memory space is checked. In certain examples, memory space check may be performed to determine whether the ESP partition storage space has enough space to write BIOS recovery files. At block 250, a determination is made whether a user consents to making changes to an information handling system. If the user does not consent to changes, the telemetry data is logged as write failure at block 254 and flow ends at block 210. If the user does consent to changes, the BIOS recovery files are written to memory at block 252 and the flow ends at block 210.

Figure 4:
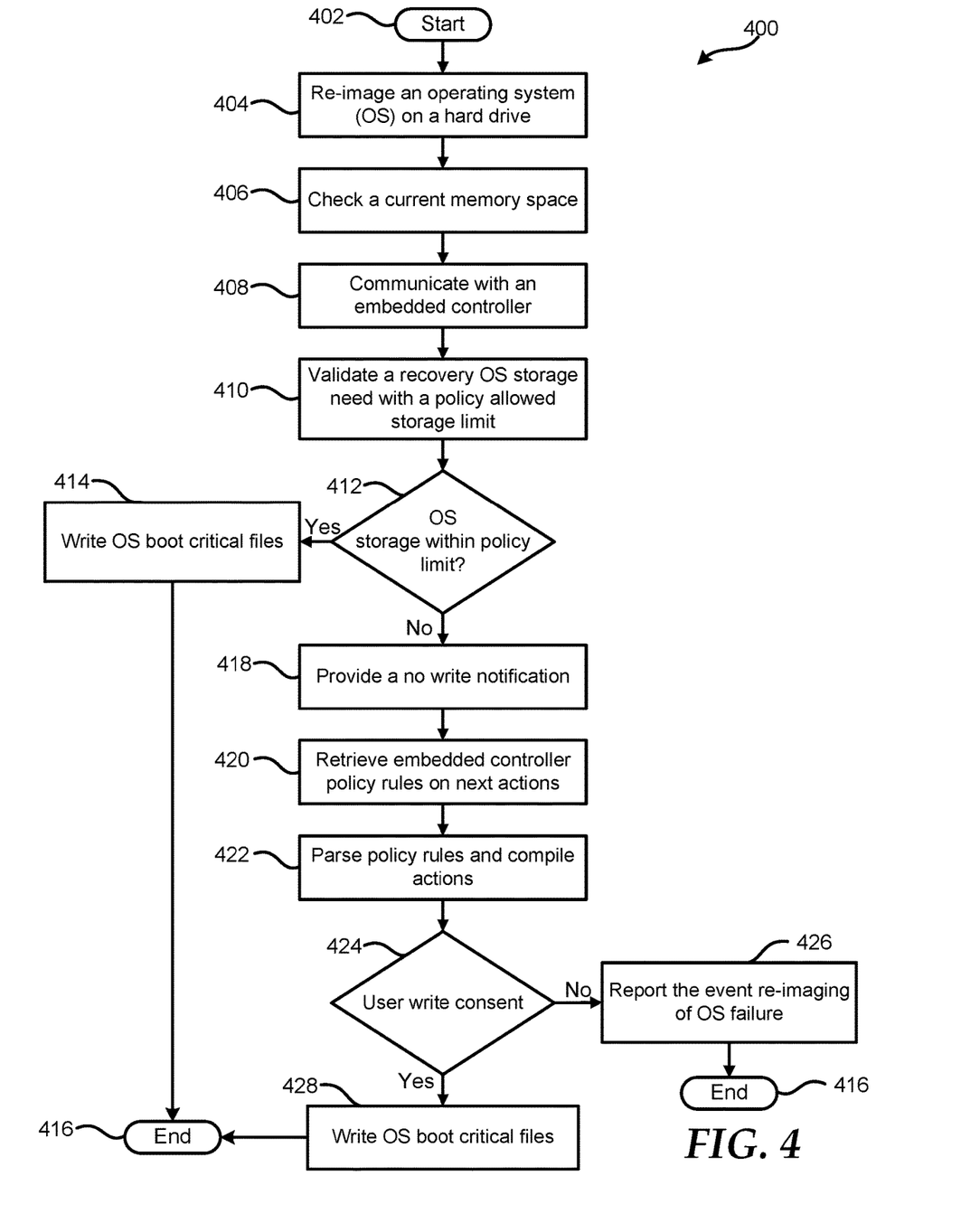
FIG. 4 is a flow diagram of a method for preventing memory space saturation via a memory policy according to at least one embodiment of the present disclosure.

FIG. 4 is a flow diagram of a method 400 for preventing memory space saturation via a memory policy according to at least one embodiment of the present disclosure, starting at block 402. It will be readily appreciated that not every method step set forth in this flow diagram is always necessary, and that certain steps of the methods may be combined, performed simultaneously, in a different order, or perhaps omitted, without varying from the scope of the disclosure. FIG. 4 may be employed in whole, or in part, embedded controller 102 and BIOS 104 of FIG. 1, or any other type of controller, device, module, processor, or any combination thereof, operable to employ all, or portions of, the method of FIG. 4.

At block 404, an operating system (OS) on a hard drive is re-imaged. At block 406, a current memory space is checked. In an example, the current memory space may be an extended system partition (ESP) memory space and the current available storage capacity of the memory space may be checked. At block 408, a communication with an embedded controller is performed. At block 410, a recovery OS storage need with a policy allowed storage limit is validated.

At block 412, a determination is made whether the OS storage is within policy limits. In an example, the policy limit may be an ESP partition size set by an ESP memory storage policy. If the OS storage is within policy limits, the OS boot critical files are written at block 414 and the flow ends at block 416. If the OS storage is not within policy limits, a no write notification is provided at block 418. At block 420, embedded controller policy rules on next actions are retrieved. At block 422, the policy rules are parsed and actions are compiled. At block 424, a determination is made whether a user has provided consent to data being written in the memory space. In an example, the user consent may be based on a notification being provided to the user that the ESP partition needs additional memory allocation to store the OS boot critical files and whether the user approves the memory allocation increase. If the user has not provided consent, the event failure of the re-imaging of OS is reported at block 426 and the flow ends at block 416. If the user has provided consent, the OS boot critical files are written at block 428 and the flow ends at block 416.

Figure 5:
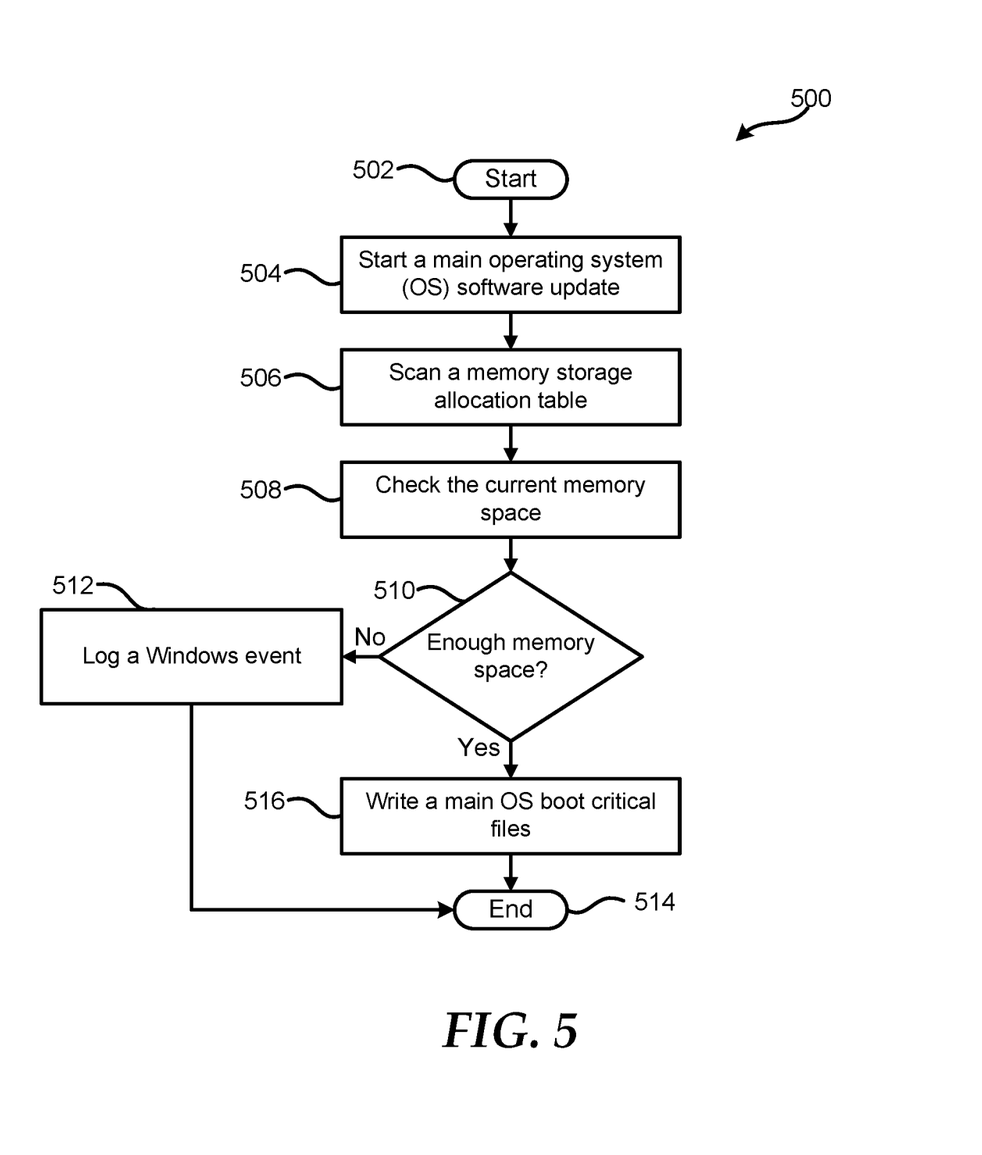
FIG. 5 is a flow diagram of a method for writing to a memory space based on a storage policy according to at least one embodiment of the present disclosure.

FIG. 5 is a flow diagram of a method 500 for writing to a memory space based on a storage policy according to at least one embodiment of the present disclosure, starting at block 502. It will be readily appreciated that not every method step set forth in this flow diagram is always necessary, and that certain steps of the methods may be combined, performed simultaneously, in a different order, or perhaps omitted, without varying from the scope of the disclosure. FIG. 5 may be employed in whole, or in part, embedded controller 102 and BIOS 104 of FIG. 1, or any other type of controller, device, module, processor, or any combination thereof, operable to employ all, or portions of, the method of FIG. 5.

At block 504, a main operating system (OS) software update is started. In an example, the OS software update may be any suitable type of update, such as driver updates, an OS patch update or the like. At block 506, a memory storage allocation table is scanned. In certain examples, the memory storage allocation table may be any suitable type of table, such as a configuration and power interface (ACPI) table. In an example, the memory storage allocation table may be formed by any suitable operations and by any suitable component. For example, a core service may create a policy and populate the policy in the ACPI table. The core service may be a firmware service in a basic input/output system (BIOS) of the information handling system. In an example, core service may dynamically create the ACPI table. The ACPI table may include different policies for data storage in a memory space, such as an extended system partition (ESP) memory space. In an example, the policy may include any suitable data associated with the ESP memory space, such as storage requirements, storage limits, or the like.

At block 508, the current memory space is checked. In an example, the current memory space may be the amount of ESP memory space available to store data. At block 510, a determination is made whether enough memory space is available for writing boot critical files. This determination may be made in any suitable manner. For example, the determined memory space may be compared to a memory space limit or minimum amount of memory space needed as stored in the ACPI table. If the determination is that not enough memory space is available, an error event is logged at block 512 and the method ends at block 514. If enough memory space is available, the main OS boot critical files are written at block 516 and the method ends at block 514.

Figure 6:
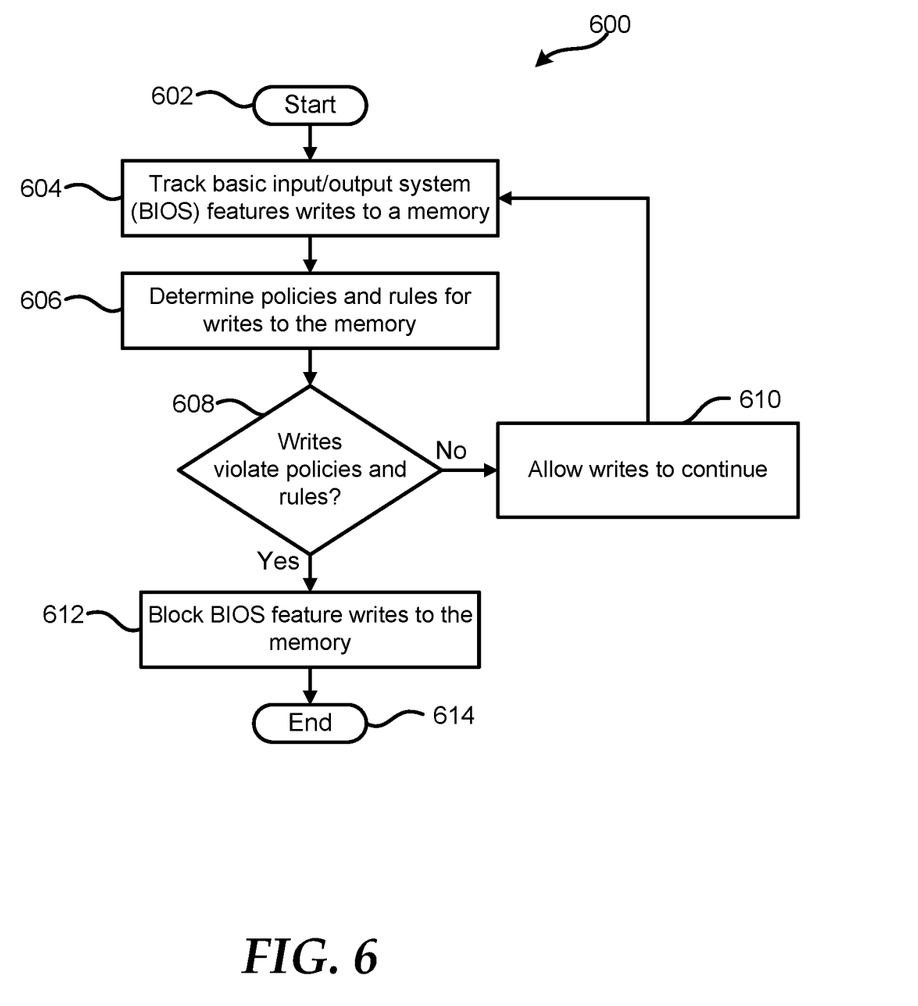
FIG. 6 is a flow diagram of a method for blocking write to a memory space based on a storage policy according to at least one embodiment of the present disclosure.

FIG. 6 is a flow diagram of a method 600 for blocking write to a memory space based on a storage policy according to at least one embodiment of the present disclosure, starting at block 602. It will be readily appreciated that not every method step set forth in this flow diagram is always necessary, and that certain steps of the methods may be combined, performed simultaneously, in a different order, or perhaps omitted, without varying from the scope of the disclosure. FIG. 6 may be employed in whole, or in part, embedded controller 102 and BIOS 104 of FIG. 1, or any other type of controller, device, module, processor, or any combination thereof, operable to employ all, or portions of, the method of FIG. 6.

At block 604, writes to an ESP partition of a memory by BIOS features are tracked. In an example, the BIOS features may include, but are not limited to, BIOS-IQ application, firmware service, and DFU applications. In certain examples, the writes may be tracked or monitor by an EC of the information handling system. The EC may monitor the writes over a MBOX interface between the EC and the BIOS. At block 606, policies and rules for write to the ESP partition of the memory are determined. In an example, the policies and rules may be determined from an ESP memory storage policy table stored in a memory of the EC.

At block 608, a determination is made whether one or more of the write operations violate one or more of the ESP storage policies or rules. If the writes do not violate rules or policies, the BIOS feature writes are allowed to continue at block 610 and the flow continues as described above at block 604. If the writes violate the rules and policies, the writes to the ESP partition are blocked at block 612 and the flow ends at block 614. In an example, the EC may block the writes in any suitable manner. For example, the EC may provide a command to the firmware of the memory to block writes to the ESP partition of the memory by the software/firmware features of the BIOS. In an example, the EC may provide the command to the firmware via the memory controller of the memory over an I2C SMBus interface. In certain examples, the blocking of writes may be at a root or sector level.

Figure 7:
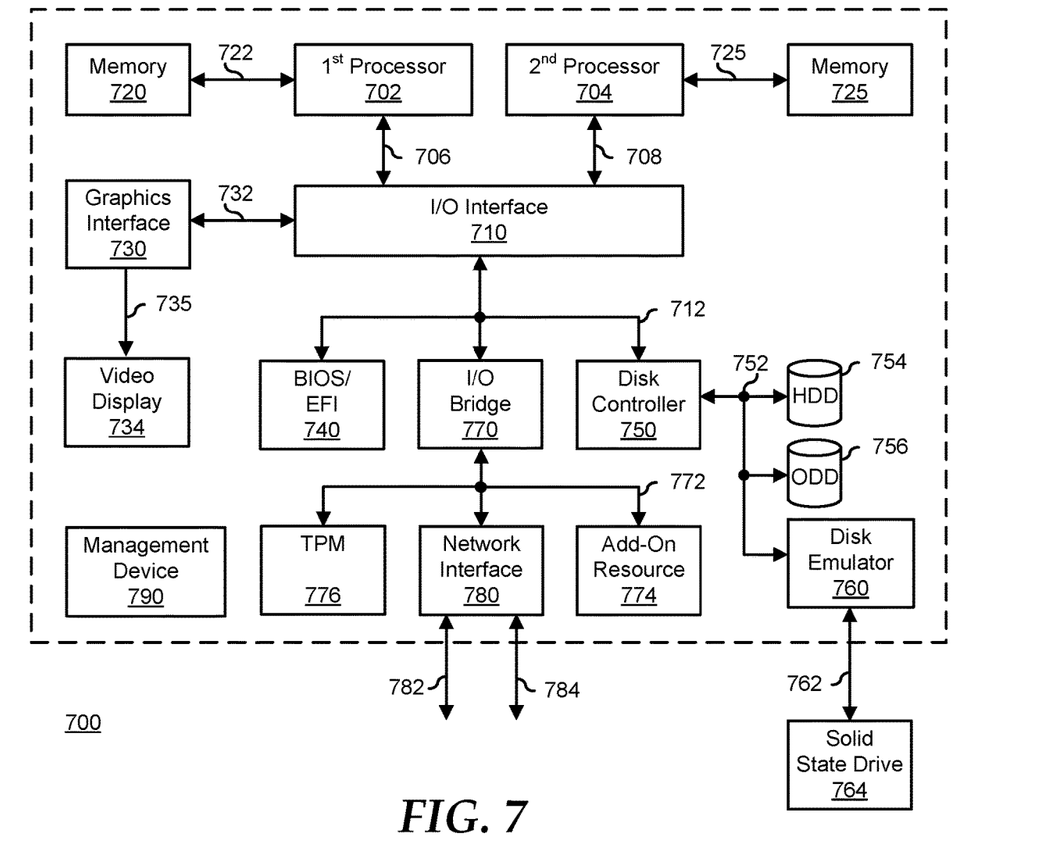
FIG. 7 is a block diagram of a general information handling system according to an embodiment of the present disclosure.

FIG. 7 shows a generalized embodiment of an information handling system 700 according to an embodiment of the present disclosure. Information handling system 700 may be substantially similar to information handling system 100 of FIG. 1. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 700 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 700 can include processing resources for executing machine-executable code, such as a central processing unit (CPU), a programmable logic array (PLA), an embedded device such as a System-on-a-Chip (SoC), or other control logic hardware. Information handling system 700 can also include one or more computer-readable medium for storing machine-executable code, such as software or data. Additional components of information handling system 700 can include one or more storage devices that can store machine-executable code, one or more communications ports for communicating with external devices, and various input and output (I/O) devices, such as a keyboard, a mouse, and a video display. Information handling system 700 can also include one or more buses operable to transmit information between the various hardware components.

Information handling system 700 can include devices or modules that embody one or more of the devices or modules described below and operates to perform one or more of the methods described below. Information handling system 700 includes a processors 702 and 704, an input/output (I/O) interface 710, memories 720 and 725, a graphics interface 730, a basic input and output system/universal extensible firmware interface (BIOS/UEFI) module 740, a disk controller 750, a hard disk drive (HDD) 754, an optical disk drive (ODD) 756, a disk emulator 760 connected to an external solid state drive (SSD) 762, an I/O bridge 770, one or more add-on resources 774, a trusted platform module (TPM) 776, a network interface 780, a management device 790, and a power supply 795. Processors 702 and 704, I/O interface 710, memory 720, graphics interface 730, BIOS/UEFI module 740, disk controller 750, HDD 754, ODD 756, disk emulator 760, SSD 762, I/O bridge 770, add-on resources 774, TPM 776, and network interface 780 operate together to provide a host environment of information handling system 700 that operates to provide the data processing functionality of the information handling system. The host environment operates to execute machine-executable code, including platform BIOS/UEFI code, device firmware, operating system code, applications, programs, and the like, to perform the data processing tasks associated with information handling system 700.

In the host environment, processor 702 is connected to I/O interface 710 via processor interface 706, and processor 704 is connected to the I/O interface via processor interface 708. Memory 720 is connected to processor 702 via a memory interface 722. Memory 725 is connected to processor 704 via a memory interface 727. Graphics interface 730 is connected to I/O interface 710 via a graphics interface 732 and provides a video display output 736 to a video display 734. In a particular embodiment, information handling system 700 includes separate memories that are dedicated to each of processors 702 and 704 via separate memory interfaces. An example of memories 720 and 730 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 740, disk controller 750, and I/O bridge 770 are connected to I/O interface 710 via an I/O channel 712. An example of I/O channel 712 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 710 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. BIOS/UEFI module 740 includes BIOS/UEFI code operable to detect resources within information handling system 700, to provide drivers for the resources, initialize the resources, and access the resources. BIOS/UEFI module 740 includes code that operates to detect resources within information handling system 700, to provide drivers for the resources, to initialize the resources, and to access the resources.

Disk controller 750 includes a disk interface 752 that connects the disk controller to HDD 754, to ODD 756, and to disk emulator 760. An example of disk interface 752 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 760 permits SSD 764 to be connected to information handling system 700 via an external interface 762. An example of external interface 762 includes a USB interface, an IEEE 4394 (Firewire) interface, a proprietary interface, or a combination thereof. Alternatively, solid-state drive 764 can be disposed within information handling system 700.

I/O bridge 770 includes a peripheral interface 772 that connects the I/O bridge to add-on resource 774, to TPM 776, and to network interface 780. Peripheral interface 772 can be the same type of interface as I/O channel 712 or can be a different type of interface. As such, I/O bridge 770 extends the capacity of I/O channel 712 when peripheral interface 772 and the I/O channel are of the same type, and the I/O bridge translates information from a format suitable to the I/O channel to a format suitable to the peripheral channel 772 when they are of a different type. Add-on resource 774 can include a data storage system, an additional graphics interface, a network interface card (NIC), a sound/video processing card, another add-on resource, or a combination thereof. Add-on resource 774 can be on a main circuit board, on separate circuit board or add-in card disposed within information handling system 700, a device that is external to the information handling system, or a combination thereof.

Network interface 780 represents a NIC disposed within information handling system 700, on a main circuit board of the information handling system, integrated onto another component such as I/O interface 710, in another suitable location, or a combination thereof. Network interface device 780 includes network channels 782 and 784 that provide interfaces to devices that are external to information handling system 700. In a particular embodiment, network channels 782 and 784 are of a different type than peripheral channel 772 and network interface 780 translates information from a format suitable to the peripheral channel to a format suitable to external devices. An example of network channels 782 and 784 includes InfiniBand channels, Fibre Channel channels, Gigabit Ethernet channels, proprietary channel architectures, or a combination thereof. Network channels 782 and 784 can be connected to external network resources (not illustrated). The network resource can include another information handling system, a data storage system, another network, a grid management system, another suitable resource, or a combination thereof.

Management device 790 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 700. In particular, management device 790 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 700, such as system cooling fans and power supplies. Management device 790 can include a network connection to an external management system, and the management device can communicate with the management system to report status information for information handling system 700, to receive BIOS/UEFI or system firmware updates, or to perform other task for managing and controlling the operation of information handling system 700.

Management device 790 can operate off of a separate power plane from the components of the host environment so that the management device receives power to manage information handling system 700 when the information handling system is otherwise shut down. An example of management device 790 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 790 may further include associated memory devices, logic devices, security devices, or the like, as needed, or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a first memory including an extended system partition (ESP);
   a basic input/output system (BIOS) configured to communicate with the first memory, the BIOS to:
      create a table, wherein the table includes data associated with a first amount of memory space in the ESP needed for BIOS firmware images; and
      store the table in a second memory of the BIOS; and
   a processor configured to communicate with the first memory and with the BIOS, during an initialization of an operating system (OS), the processor to:
      retrieve the data from the table;
      determine a second amount of memory space in the ESP needed for OS boot critical files;
      determine a total amount of memory space needed in the ESP based on the first and second amounts of memory space; and
      allocate the total amount of memory space to the ESP in the first memory.

2. The information handling system of claim 1, further comprising: an embedded controller configured to communicate with the first memory and with the BIOS, the embedded controller to:
   create a memory storage policy associated with the ESP, wherein the memory storage policy includes a plurality of rules for access to the ESP; and
   store the memory storage policy in a third memory of the embedded controller.

3. The information handling system of claim 2, wherein components of the information handling system to access the ESP based on the rules to prevent saturation of the ESP.

4. The information handling system of claim 2, wherein the EC further to: access the first memory via a memory controller of the first memory.

5. The information handling system of claim 2, wherein the EC further to:
   monitor access of the ESP by BIOS services, and
   based on one of the BIOS services exceeding an memory space limit in the ESP for the one of the BIOS service, end access of the ESP by the one of the BIOS services, wherein the memory space limit for the one of the BIOS services is stored in the memory storage policy.

6. The information handling system of claim 1, wherein the BIOS further to: update the table to include a current available amount of memory space in the ESP.

7. The information handling system of claim 6, wherein during a software update, the processor to:
   determine a size of files for the software update;
   retrieve the current available amount of memory space from the table;
   based on the current available amount of memory space, determine whether the files for the software update may be stored in the ESP; and
   in response to the files for the software update being able to be stored in the ESP, store the files for the software update in the ESP.

8. The information handling system of claim 7, in response to the files for the software update being able to be stored in the ESP, the processor to log an error event associated with the software update.

9. A method comprising:
   creating, by a basic input/output system (BIOS) of an information handling system, a table that includes data associated with a first amount of memory space in an extended system partition (ESP) of a first memory needed for BIOS firmware images;
   store the table in a second memory of the BIOS;
   during an initialization of an operating system (OS):
     retrieving, by a processor of the information handling system, the data from the table;
     determine a second amount of memory space in the ESP needed for OS boot critical files;
     determine a total amount of memory space needed in the ESP based on the first and second amounts of memory space; and
     allocate, by the processor, the total amount of memory space to the ESP in the first memory.

10. The method of claim 9, further comprising:
    creating, by an embedded controller (EC) of the information handling system, a memory storage policy associated with the ESP, wherein the memory storage policy includes a plurality of rules for access to the ESP; and
    storing the memory storage policy in a third memory of the embedded controller.

11. The method of claim 10, wherein components of the information handling system to access the ESP based on the rules to prevent saturation of the ESP.

12. The method of claim 10 further comprising accessing, by the EC, the first memory via a memory controller of the first memory.

13. The method of claim 10, further comprising:
    monitoring, by the EC, access of the ESP by BIOS services, and
    based on one of the BIOS services exceeding an memory space limit in the ESP for the one of the BIOS service, ending access of the ESP by the one of the BIOS services, wherein the memory space limit for the one of the BIOS services is stored in the memory storage policy.

14. The method of claim 9, further comprising: updating, by the BIOS, the table to include a current available amount of memory space in the ESP.

15. The method of claim 14 wherein during a software update, the method further comprises:
    determining, by the processor, a size of files for the software update;
    retrieving the current available amount of memory space from the table;
    based on the current available amount of memory space, determining whether the files for the software update may be stored in the ESP; and
    in response to the files for the software update being able to be stored in the ESP, storing, by the processor, the files for the software update in the ESP.

16. The method of claim 15, in response to the files for the software update being able to be stored in the ESP, the method further comprises: logging an error event associated with the software update.

17. An information handling system comprising:
    a first memory including an extended system partition (ESP);
    a basic input/output system (BIOS) to:
      create a table that includes data associated with a first amount of memory space in the ESP needed for BIOS firmware images;
      store the table in a second memory of the BIOS; and
      update the table to include a current available amount of memory space in the ESP;
    a processor configured, during an initialization of an operating system (OS), to:
      retrieve the data from the table;
      determine a second amount of memory space in the ESP needed for OS boot critical files;
      determine a total amount of memory space needed in the ESP based on the first and second amounts of memory space; and
      allocate the total amount of memory space to the ESP in the first memory; and
    an embedded controller configured to:
    create a memory storage policy associated with the ESP, wherein the memory storage policy includes a plurality of rules for access to the ESP; and
    store the memory storage policy in a third memory of the embedded controller.

18. The information handling system of claim 17 wherein during a software update, the processor to:
    determine a size of files for the software update;
    retrieve the current available amount of memory space from the table;
    based on the current available amount of memory space, determine whether the files for the software update may be stored in the ESP; and
    in response to the files for the software update being able to be stored in the ESP, store the files for the software update in the ESP.

19. The information handling system of claim 18, in response to the files for the software update being able to be stored in the ESP, the processor to log an error event associated with the software update.

20. The information handling system of claim 17, wherein the EC further to:
    monitor access of the ESP by BIOS services, and
    based on one of the BIOS services exceeding an memory space limit in the ESP for the one of the BIOS service, end access of the ESP by the one of the BIOS services, wherein the memory space limit for the one of the BIOS services is stored in the memory storage policy.

* * * * *